Dec. 12, 1944.  O. F. DRENNAN  2,364,958
PLANTER
Filed Dec. 23, 1940  3 Sheets-Sheet 1

INVENTOR:
ORVILLE F. DRENNAN
BY
ATTORNEYS.

Dec. 12, 1944.   O. F. DRENNAN   2,364,958
PLANTER
Filed Dec. 23, 1940   3 Sheets-Sheet 2

INVENTOR:
ORVILLE F. DRENNAN
BY
ATTORNEYS.

Dec. 12, 1944. O. F. DRENNAN 2,364,958
PLANTER
Filed Dec. 23, 1940 3 Sheets-Sheet 3
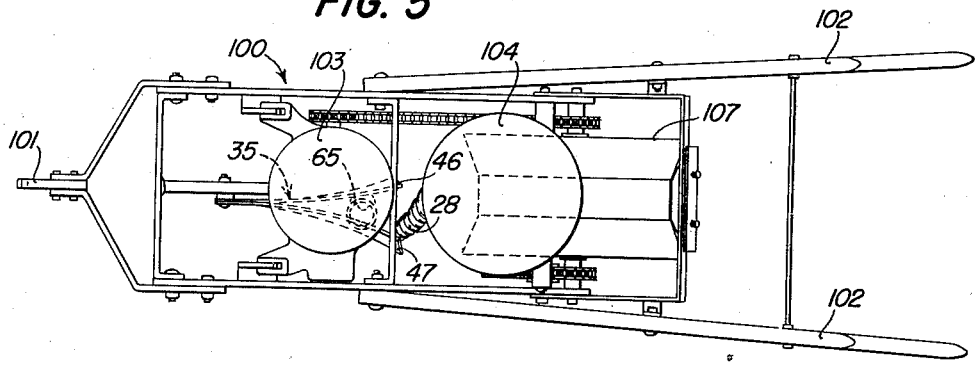
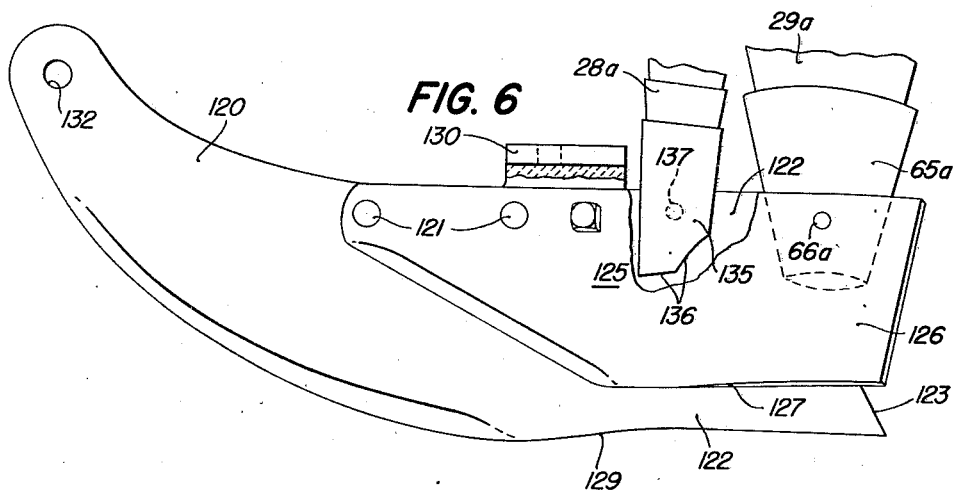
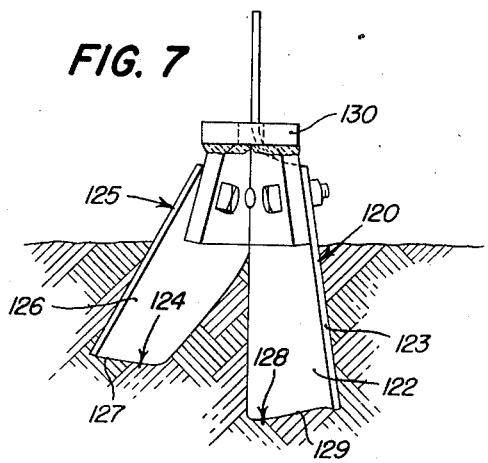
INVENTOR:
ORVILLE F. DRENNAN
BY
ATTORNEYS.

Patented Dec. 12, 1944

2,364,958

UNITED STATES PATENT OFFICE 2,364,958

PLANTER

Orville F. Drennan, Moline, Ill., assignor to Deere & Company, Moline, Ill., a corporation of Illinois Application December 23, 1940, Serial No. 371,276

26 Claims. (Cl. 111—80)

The present invention relates generally to agricultural implements and more particularly to planters and the like.

The object and general nature of this invention is the provision of a new and improved furrow opener constructed and arranged to form two laterally spaced furrows with a separating ridge of soil therebetween. Seed, either of the same kind or of different kind, may be deposited in both furrows, or one may be used to receive seed and the other to receive fertilizer, with the ridge of soil serving to prevent the fertilizer from coming into contact with the seed. Another feature of this invention is the provision of a furrow opener of the runner type, having laterally spaced parts which form two furrows with a ridge of soil therebetween, one furrow preferably being deeper than the other. A further feature of this invention is the provision of a planter furrow opener so constructed and arranged to form a single furrow to receive fertilizer alongside the furrow formed to receive seed.

The advantage of this arrangement lies principally in its simple, sturdy construction and relatively light draft. Heretofore, fertilizer distributors associated with planting means have incorporated either separate fertilizer furrow openers, which required separate supporting means and other parts, or attachments which generally operated to form two fertilizer furrows, one at each side of the seed furrow. While attachments of this kind have been generally satisfactory, it has been found that even more satisfactory results may be secured by placing the fertilizer in a single furrow, and in this connection it is therefore a feature of the invention to provide a simple construction for forming a single seed furrow and a single fertilizer furrow. A furrow opener of this type has a materially lighter draft than constructions in which provision is made for forming two fertilizer furrows.

Still further, another feature of this invention is the provision of a combined seed and fertilizer furrow opener, consisting of adjustable parts, one to form the seed furrow and the other to form the fertilizer furrow, which parts may be adjusted to form one or the other of the furrows at a different level, as required by planting customs and conditions. At the present time it is generally considered that the fertilizer should be placed below and to one side of the seed, and the combined seed and fertilizer furrow opener of the present invention is admirably adapted for such use. However, the fertilizer opener parts may be adjusted to place the seed below the fertilizer, if that should be desired. Still further, another feature of this invention is the provision of means for forming two furrows, one to receive seed and the other to receive fertilizer, the seed furrow being substantially V-shaped in cross section so that if the seed should tend to roll, they cannot become displaced laterally in the furrow. Therefore, the seed will always be found at substantially constant spacing from the fertilizer furrow. If the seed furrow should, for example, be flat on the bottom, the seed may roll in different directions, sometimes lying against one side of such a seed furrow and sometimes at the other, whereby the distance from the seed to the fertilizer may vary by substantial amounts. Under such conditions the stand would be nonuniform.

These and other objects and advantages of the present invention will be apparent to those skilled in the art after a consideration of the following detailed description taken in conjunction with the accompanying drawings.

In the drawings:

Figure 5 is a plan view showing the present invention incorporated in a walking planter; and Figures 6 and 7 are side and rear views of a modified form of the present invention.

Figure 1:
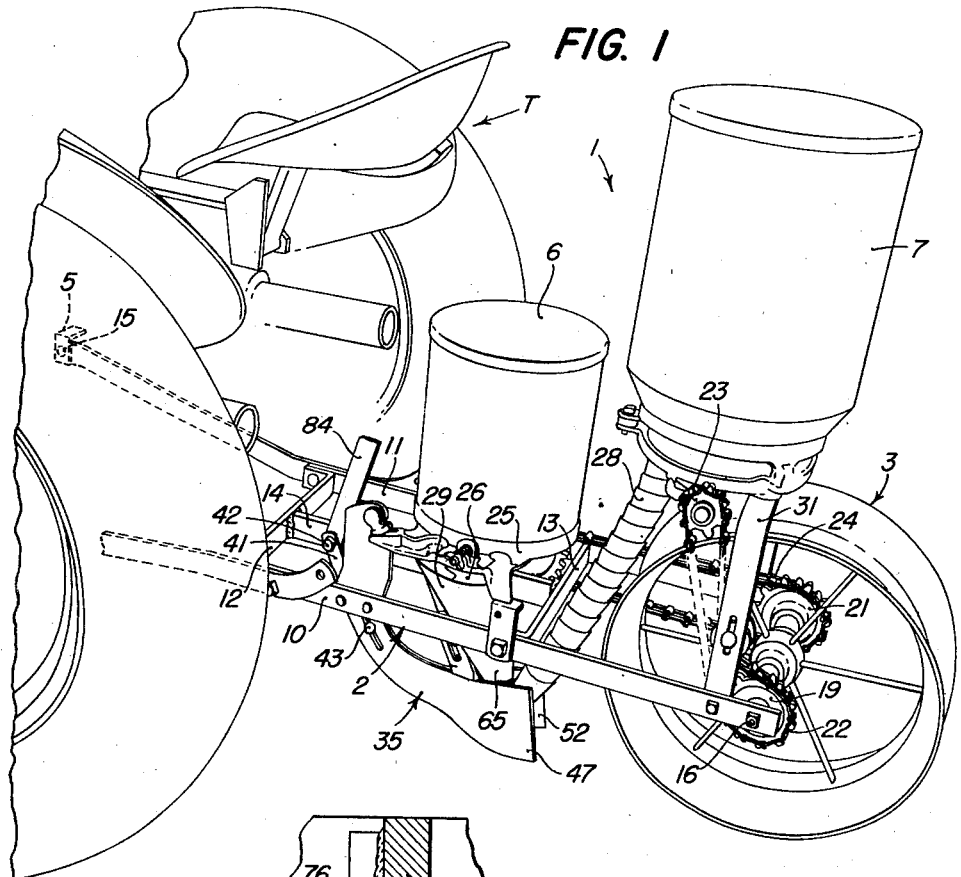
Figure 1 is a perspective view of a tractor planter in which the principles of the present invention have been incorporated.
Figure 2:
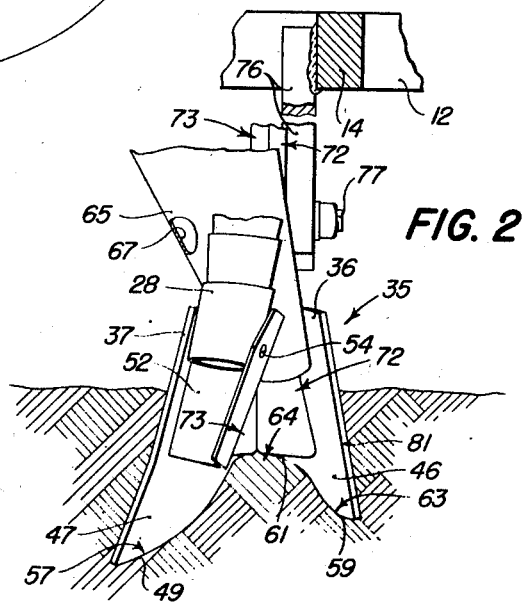
Figure 2 is a fragmentary rear view, looking forwardly, showing the shape of the seed and fertilizer furrows formed by the combined planter and fertilizer shoe of the present invention.
Figures 3, 4:
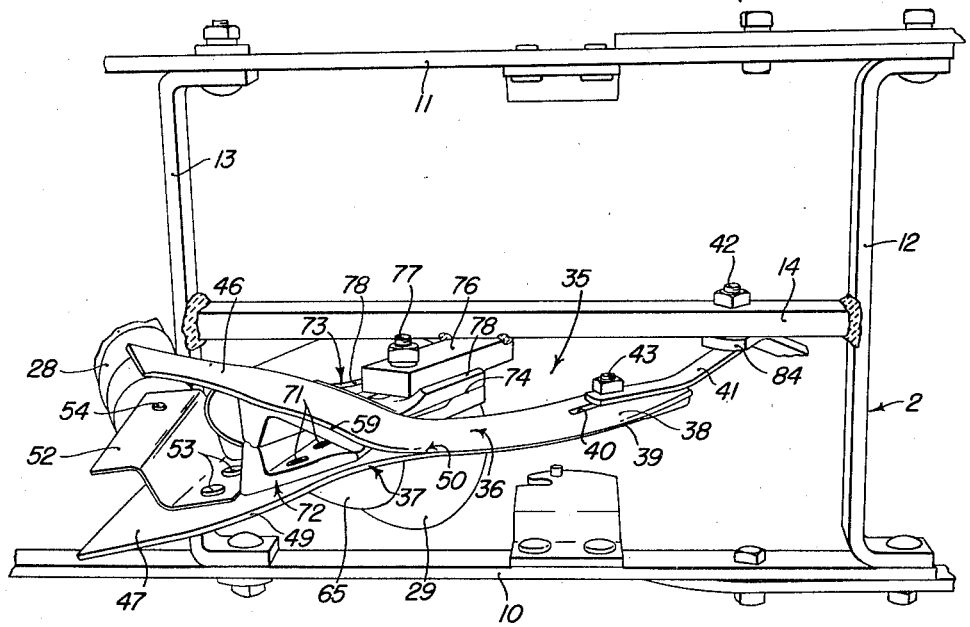
Figure 3 is a perspective view looking upwardly from the lower portion of the planter furrow opener.
Figure 4 is an enlarged fragmentary side view of the combined planter and fertilizer shoe.

Referring now to the drawings, more particularly to Figures 1, 2 and 3, the planter shown is a one-row tractor planter of the type used to plant corn or cotton and having a fertilizer attachment. However, it is to be understood that this invention is applicable to either single or multi-row planters of any type, whether tractor-drawn or not, capable of handling any kind of seed. The tractor is indicated by the reference letter T and the planter itself is indicated in its entirety by the reference numeral 1 and comprises a frame 2 supported at its rear end on a press wheel 3 and at its forward end on the tractor by any suitable means, such as brackets 5, a seed can 6, a fertilizer can 7, and suitable selecting and distributing mechanism for the seed and fertilizer cans. Any suitable seed selecting and fertilizer feeding mechanisms may be provided, since the present invention is not concerned with the particular details per se of such mechanisms. The frame 2 comprises two generally longitudinally extending frame bars 10 and 11 spaced apart laterally by a pair of cross bars 12 and 13 to which a central longitudinally extending frame bar 14 is secured, as by welding or the like. Preferably, the cross bars 12 and 13 are bolted to the side bars 10 and 11, and the latter extend forwardly and laterally outwardly and are pivoted, as at 15, to the hitch brackets 5.

The press wheel 3 is of usual construction, and is mounted on an axle 16 carried adjacent the rear ends of the side bars 10 and 11. The wheel 3 is provided with a pair of driving sprockets 19 and 21, the former being connected by a chain 22 to drive the sprocket 23 which forms a part of the fertilizer feeding mechanism. The drive sprocket 21 is connected by a chain 24 to the seed selecting mechanism carried by the hopper bottom 25, which forms a part of the seed can 6, as in conventional construction. A fertilizer tube 28 leads downwardly from the fertilizer hopper 7 and a picker wheel 26 of the seed selecting mechanism delivers seed into a seed conduit or funnel 29 carried in any suitable way by the frame 2. A bracket 31 is secured to the rear ends of the frame bars 10 and 11 for supporting the fertilizer hopper 7 substantially above the press wheel 3.

The present invention is particularly concerned with the furrow opener, which is designed to form a seed furrow and a fertilizer furrow laterally spaced therefrom, with a ridge of soil therebetween. The planter furrow opener, which is indicated in its entirety by the reference numeral 35, will now be described.

As best shown in Figures 3 and 4, the planter furrow opener 35 consists of a pair of runner plates 36 and 37 having their forward portions 38 and 39 formed to fit flat against one another and having slots 40 therein. A link 41 is bolted, as at 42, to the center frame bar 14, and at its lower end the link 41 is secured, as by a bolt 43, to the front end of the planter furrow opener 35. The rear end portions of the runner plates 36 and 37 are offset laterally outwardly from the central vertical plane of the runner 35, which passes through the forward portion 38, 39 of the furrow opener 35, so as to form rearwardly diverging parts, as indicated at 46 and 47.

The lower edge of each of the divergent portions 46 and 47 is particularly formed and shaped to open a furrow in the soil when the implement is drawn across a field. The section 47 extends downwardly farther than the other section 46 and the lower edge 49 of the section 47 is curved generally downwardly from the point, indicated at 50, where the runner plates begin to diverge. A short section of Z-bar 52 is riveted, as at 53, or otherwise secured to the rear portion of the section 47, and the flange of the Z-bar 52 is apertured adjacent its upper edge to receive a pin 54 or the like by which the lower end of the fertilizer tube 28 is fastened thereto, the lower end of the tube 28 being disposed between the flange of the Z-bar or bracket 52 and the inner surface of the runner plate section 47. It will be noted from Figure 3 that the upper end of the Z-bar is so formed that at this point the flange is spaced farther away from the runner section 47 than at the lower end. This disposes the lower end completely behind the laterally outwardly offset section 47 of the fertilizer runner plate 37, as indicated in Figure 3, and in Figure 2 the shape of the furrow opened by the laterally offset section 47 is shown, the fertilizer furrow being indicated by the reference numeral 57.

The seed furrow is formed by the laterally offset section 46 of the other runner plate 36, and hence the latter is referred to as a seed furrow runner plate. The section 46 of the plate 36 curves laterally away from the curved section 47 of the fertilizer runner plate, and the lower edge 59 of the seed runner plate 36 lies above the level of the lower edge 49 of the fertilizer plate 37 when the parts are adjusted for the position shown in Figure 4. From this figure it will also be noted that the lower edge 59 of the seed runner plate 36 is formed with an upwardly curved part 61 adjacent the point 50 where the plates 36 and 37 begin to diverge. Rearwardly of this curved part 61, the edge 59 extends downwardly at a slight angle, as shown in Figure 2. This particular construction of the seed runner plate 36 and its relation to the fertilizer runner plate results in the formation of a seed furrow, indicated by the reference numeral 63 which lies above the fertilizer furrow 57 and at one side of the latter, with a ridge of soil, as indicated by the reference numeral 64, therebetween. The notch 61 provides a relatively open portion adjacent the juncture 50 so that there is little tendency for trash and the like to collect at this point.

From the above description it will thus be clear, particularly from Figure 2, that the planter furrow opener 35 forms two laterally spaced furrows 57 and 63 with a ridge 64 of soil between the two furrows. It will also be noted that by virtue of the curvature of the lower edges 49 and 59 of the fertilizer and seed runner plates the bottom walls of the furrows 57 and 63 extend laterally and downwardly, in effect forming generally V-shaped furrows. The fertilizer furrow 57 is wider, generally speaking, than the seed furrow 63, the width of the latter at its lowermost portion being only that required to receive the desired number of seed. Having the seed furrow 63 relatively narrow and generally V-shaped in cross section results in a construction in which the seed will always be disposed in the soil a uniform or constant distance from the fertilizer furrow 57. This results in a uniform stand since the effectiveness of the fertilizer does not vary in different parts of the field, as would be the case if the seed furrow were flat on the bottom or wide enough to permit variations in the lateral distance between the seed when it comes to rest and the adjacent fertilizer furrow. As will be readily understood, the ridge of soil 64 effectively prevents any of the fertilizer coming into direct contact with the seed in the furrow 63. If desired, the clip 52, which serves as an extension of the fertilizer tube 28, may be formed to extend below the level of the seed runner plate 36 so that, with the ridge of soil 64, it is practically impossible for any of the fertilizer to be deposited in the seed furrow 63. It is not essential, however, to have the part 52 below the level of the lower edge 59 of the seed runner plate 36. The relationship of the parts as shown in Figure 2 has proven to be satisfactory in this regard. It will be noted that the seed can funnel 29 discharges into a runner conduit 65 which is secured, as by a rivet 66, to the runner plate 36 and that the part 65 has its laterally inner wall 67 disposed so that the seed dropping down through the part 29 will be directed over to the lowermost corner of the generally V-shaped seed furrow 63. The member 65 may be a flexible tube, such as a short section of stock similar to the fertilizer tube 28, or it may be a cylindrical or conical member formed of sheet metal or other material, as desired.

In order to provide for adjusting the position of one runner blade relative to the other, the runners 35 and 36 have guide members 72 and 73 secured thereto, as by rivets 71. Each guide member has interengaging grooves and ridges, as best shown in Figure 3 and as indicated at 74. The upper portions of the guide members 72 and 73 are provided with elongated slots 75, and these slots are disposed so as to be generally parallel with the slots 40 in the front ends of the runner blades 36 and 37. A standard 76 is fixed, as by welding, to one side of the center frame bar 14 and is apertured at its lower end to receive a clamping bolt 77 which passes through the two slots in the guide members 72 and 73. The guide block 73 secured to the left runner plate 36 has ribs 78 between which the standard 76 is received.

When the bolt 77 is tightened the two guide members are firmly secured together and serve to hold the two runners 36 and 37 in adjusted position. When the bolt 77 is loosened to provide for adjusting one runner with respect to the other, the bolt 43 connecting the link 41 to the runners is also loosened, as will be readily understood. Thus, by virtue of this construction, the parts 36 and 37 may be adjusted so as to have the seed furrow either above or below the fertilizer furrow. Preferably, however, the fertilizer furrow 57 is below the seed furrow 63, and that is the position shown in Figure 4. As best shown in Figure 2, the rear sections 46 and 47 of the seed and fertilizer runner plates 36 and 37 are disposed in planes that converge upwardly. This particular arrangement leaves the laterally outer walls of the furrows overhanging the bottoms of the furrows so that after the passage of the furrow opener, soil immediately falls into the furrows and covers the fertilizer and seed therein. In other words, the width of the two furrows combined at the surface of the ground is only that required to accommodate the seed and fertilizer tubes. In Figure 4 it will be noted that the rear edge, indicated by the reference numeral 81, lies in a transverse plane and extends upwardly and rearwardly. This particular arrangement serves to hold back the clods and dry soil at the ground surface for a moment after the lower part of the edge 81 permits a certain amount of the lower moist soil to fall onto the seed before the furrow opener proceeds far enough to permit the dry soil at the surface of the ground to fall into the seed furrow 63. This materially aids rapid germination of the seed, as will be obvious. The rear edge of the fertilizer runner plate is not undercut since it is more or less immaterial whether dry soil or moist soil falls on top of the fertilizer.

As best shown in Figure 2, the planter furrow opener 35 is disposed to one side of the central portion of the frame 2 far enough to bring the seed furrow 63 and the seed opener runner 36 in fore and aft alignment with the central part of the frame and with the central part of the press wheel 3. It is important to have the seed deposited in the center of the furrow so that the press wheel forms the soil uniformly on both sides of the seed, but it is more or less immaterial that the press wheel does not run over the center of the fertilizer furrow. The planter furrow opener 35 is secured to the frame 2 in offset position, first, by virtue of the standard 76 which itself is secured to one side of the center frame bar 14, the two guide members carrying the runner plates being disposed on the opposite side of the standard 76. Since the press wheel 3 is disposed centrally of the frame, the planter furrow opener 35 is displaced to one side of the central vertical plane of the frame and press wheel by an amount which equals one-half the thickness of the center bar 14, the thickness of the standard 76 and the thickness of the laterally inward guide member 73 (Figure 3) at its upper end. The front end of the planter furrow opener 35 is fastened to the frame 2 in offset relation by means of the link 41 described above and its connection to the center frame bar 14, which is effected by the bolt 42 and, in the form of the invention shown in Figures 1 to 4, by a lifting link 84, the lower end of which is disposed between the upper end of the link 41 and the side of the center frame bar 14. However, by virtue of the offset section 46 of the planter runner section, the seed furrow 63 is substantially in the central plane of the planter frame, as shown in Figure 2.

It will be noted that where the furrow opener 35 is mounted so that the seed furrow formed thereby is in alignment with the press wheel 3, the fertilizer runner plate is disposed an appreciable distance to one side of the central longitudinal vertical plane of the implement, and it will also be noted that the rear earth engaging section 47, which usually is deeper than the opposite seed furrow forming section 46, is disposed in a plane that extends forwardly and laterally inwardly. This particular arrangement has a special advantage for planters of the one-horse walking variety, and in order to illustrate this feature of the invention, I have shown in Figure 5 a one-horse walking type of planter having a frame 100, a hitch plate 101, and a pair of handles 102, this being the usual arrangement in implements of this type. The frame 100 supports seed and fertilizer hoppers 103 and 104 provided with suitable means for delivering seed and fertilizer to suitable furrow opening means. In Figure 5 I have shown the planter furrow opener 35 mounted in place on the frame 100 so that the seed and fertilizer tubes 28 and 65 may discharge into the seed and fertilizer furrows opened by the runner 35. The frame 100 of the one-horse walking type of planter is provided with a press wheel 107 which, in the form of implement shown, serves more or less as a fulcrum about which the operator swings the planter from side to side with the handles when controlling the same.

According to the present invention, and as described above, the single furrow opener 35 opens two furrows alongside one another, with a ridge of soil therebetween. These furrows may both be used to receive seed, or one may be used for seed and the other for fertilizer in which case the ridge of soil prevents the seed and fertilizer from coming into direct contact with one another, and when both furrows receive seed, the ridge keeps the two rows of seed separated, which is of importance where the two rows are different kinds of seed. When depositing fertilizer in one furrow, it is desirable, as mentioned above, to place the furrow opener so that the seed furrow is directly in line with the press wheel, which leaves the fertilizer to one side of the center line of the machine. The fertilizer opener plate 37 ordinarily runs deeper than the seed runner plate 36 and therefore, being off side, tends to exert an appreciable force acting to swing the implement out of position, in a generally counterclockwise direction, as viewed in Figure 5, about the point of contact of the wheel 107 with the ground. However, it will be noted that the rear portion 47 of the fertilizer plate 37 is disposed in a vertical plane which leads off forwardly in the other direction whereby there is a component of force due to the pressure of the soil against the rear portion 47 which tends to swing the planter in a clockwise direction about the wheel 107, thus offsetting or counterbalancing the tendency for the offset furrow opener to shift the planter frame in the other direction. Thus, the planter as a whole is well balanced and easily controlled even though the portion of the furrow opener which forms the fertilizer furrow is to one side of the central longitudinal plane or center line of the implement. Therefore, the present invention is just as readily applicable to a walking planter as it is to a tractor planter, such as is shown in Figure 1 in which the tractor T is more than adequate to hold the planter in the proper position irrespective of the offset disposition of the planter furrow opener 35.

Figures 6 and 7 show a somewhat simpler form of planter furrow opener, one which is not adjustable. In this form of the invention the runner plate that opens the furrow for the fertilizer is indicated by the reference numeral 120 and constitutes, in effect, the main runner of the planter furrow opener. This is also true of the form of the invention described above, namely, the runner plate that opens the furrow for the fertilizer may be considered to be the main runner, since it usually operates deeper than the runner plate forming the furrow for the reception of the seed. In the form of the invention shown in Figures 6 and 7, the fertilizer runner plate 120 is provided at its rear end with a laterally offset section 122 which terminates rearwardly in an inclined edge 123. The opposite runner plate 125 is secured, as by rivets 121, to the main plate 120 and is provided with a laterally offset section 126, the sections 122 and 126 diverging rearwardly as in the construction described above. The lower edge 127 of the section 126 is curved, as best shown in Figure 7, so that the furrow, indicated at 124, to receive the seed is substantially V-shaped in cross section. In this form of the invention the furrow 128 which receives the fertilizer may be flat along the bottom, or the bottom edge 129 of the fertilizer runner plate 120 may also be curved to form the bottom of the furrow 128 substantially V-shaped in cross section, if desired. A bracket 130 is fixed in any suitable manner to the runner plates 120 and 125 so as to receive the bolt or other means by which the furrow opener may be secured to the runner shank of the planter.

In Figures 1–5, the fertilizer tube 28 is disposed behind the seed conduits 29, 65, but in some cases it may instead be desirable to have the seed conduits behind the fertilizer tube, in which case some soil may fall into the fertilizer furrow on top of the fertilizer before the seed is deposited, and therefore even if some seed should rebound and get into the fertilizer furrow it would not be burned since direct contact with the fertilizer would thus be prevented. In Figure 6, the seed conduit 29a, 65a is arranged to deposit seed in the seed furrow opened by the plate member 125 and is disposed behind the fertilizer tube 28a which discharges fertilizer into the fertilizer furrow opened by the plate 120. As best shown in Figure 6, the fertilizer tube 28a includes a lower spout member 135 which is cut away at the rear, as at 136, to prevent soil from clogging the lower end. The spout 135 is secured, as by a bolt or rivet 137, to the upper part of the plate section 122. The seed and fertilizer conduits have been omitted in Figure 7 for the sake of clarity.

The rear laterally offset sections 122 and 126 of the plates 120 and 125 are the parts thereof that form the furrows. This is, of course, true of the form of the invention shown in Figures 1–5, that is, each runner section forms its own furrow and each seed and fertilizer tube is disposed substantially directly behind the associated section of the runner plate that forms the furrow. In both forms of the invention the furrow opener is formed or shaped so as to form laterally spaced furrows with a ridge of soil therebetween. Since the furrow opener shown in Figures 6 and 7 is not adjustable, the front end of the plate 120 is provided only with a hole, rather than a slot, to receive the associated connecting means, the hole in the front end of the plate 120 being indicated by the reference numeral 132.

While I have shown and described above the preferred structure in which the principles of the present invention have been incorporated it is to be understood that, in fact, widely different means may be employed in the practice of the broader aspects of my invention.

What I claim, therefore, and desire to secure by Letters Patent is:

1. In a planter, a combination seed and fertilizer furrow opener, comprising a pair of wings connected together with their rear ends diverging rearwardly and their lower edges extending generally downwardly and outwardly so as to form a pair of laterally spaced furrows with a ridge of soil therebetween, and means for depositing seed in one of said furrows and fertilizer in the other.

2. A combination seed and fertilizer furrow opener as defined in claim 1, further characterized by said wings being arranged one lower than the other whereby one furrow is deeper than the other furrow.

3. A combined seed and fertilizer furrow opener, comprising a pair of plate members, means connecting the forward end of one of said members to the other rearwardly of the front end of the latter, said members having laterally outwardly diverging sections at the rear of the furrow opener, the lower edge of at least one of said sections being higher at the front portion than at the rear, whereby said members form laterally spaced furrows with a ridge of soil therebetween.

4. A combined seed and fertilizer furrow opener, comprising a pair of plate members connected together and having laterally outwardly divergent sections at the rear shaped to form laterally spaced furrows separated by a ridge of soil, the lower edge of at least one of said sections being so inclined that the furrow formed by said one section is substantially V-shaped in cross section.

5. A combined seed and fertilizer furrow opener, comprising a pair of runner plates, each adapted to form a furrow and having a forward portion adapted to be disposed in a generally vertical plane and a rear section displaced laterally outwardly and disposed in a plane that extends generally upwardly and laterally inwardly, whereby to form two furrows with a ridge of soil therebetween and with the outer walls of the furrows tending to overhang the bottoms, respectively, of the furrows.

6. A combined seed and fertilizer furrow opener, comprising a main runner plate having its rear end laterally offset so as to form a furrow when the plate is drawn through the soil, and a second plate fixed to said main plate so as to extend generally laterally away from the offset section of said main plate, the lower edge of said second plate being oppositely offset so as to form a second furrow alongside said first furrow with a ridge of soil therebetween.

7. A combination seed and fertilizer furrow opener for planters and the like, comprising a pair of runners, each having a laterally outwardly disposed rear portion arranged to form a furrow in the soil, one of said plates being recessed to leave a ridge of soil between the two furrows, and means adjustably securing said runners together and accommodating disposing one or the other above or below the companion runner, whereby to form furrows at different depths.

8. A furrow opener for planters and the like, comprising a pair of runners, a pair of guide members secured, respectively, to said runners and having interengaging means for determining the movement of one runner relative to the other, and means for securing said runners together in adjusted position.

9. A combination seed and fertilizer furrow opener for planters and the like, comprising a pair of runners having substantially planar forward portions adapted to lie one against the other and laterally outwardly offset rear portions adapted to form laterally spaced furrows with a ridge of soil therebetween, a pair of guide members secured, respectively, to each runner adjacent the offset portion thereof and having cooperating means serving to define the movement of one runner relative to the other, fertilizer guiding means carried by the laterally offset portion of one runner, seed guiding means carried by the laterally offset portion of the other runner, said guiding means being disposed rearwardly of said pair of guide members, and means cooperating with the latter for fixing said runners in adjusted position.

10. A combination seed and fertilizer furrow opener comprising a pair of interconnected runners arranged to form two laterally spaced furrows with a ridge of soil therebetween, one to receive seed and the other to receive fertilizer, the rear end of the runner forming the seed furrow being inclined so that dry surface soil at one side of the seed furrow is prevented from falling onto the seed until a quantity of moist soil from the side of the seed furrow below the surface of the ground falls onto the seed.

11. A planter comprising means serving as a frame, a combined seed and fertilizer runner including laterally spaced parts shaped to form two laterally spaced furrows with a ridge of soil therebetween, means for directing seed into the furrow formed by one part, means for directing fertilizer into the other furrow, and means securing said combined seed and fertilizer runner to said frame means in laterally offset relation with said one part, which forms the seed furrow, disposed generally in the central plane of said frame means.

12. A planter comprising means serving as a frame, a press wheel connected therewith, a combined seed and fertilizer furrow opener including two parts shaped to form two laterally spaced furrows, one part being disposed below the level of the other part whereby the furrow formed by said one part is deeper than the other furrow, means for delivering fertilizer into said deeper furrow, means for delivering seed to the other furrow, and means securing said opener to said frame forward of said press wheel and with said seed furrow opener part disposed substantially in alignment with said press wheel, said fertilizer furrow opener part being disposed to one side of the longitudinal center line extending through said seed furrow opener part and said press wheel, and said fertilizer furrow opener part being disposed at an angle extending forwardly and laterally toward said center line whereby the offside disposition of said fertilizer furrow opener part is counterbalanced by the angular disposition thereof.

13. A combination seed and fertilizer furrow opener for planters and the like, comprising a pair of runners, each having a laterally outwardly disposed rear portion arranged to form a furrow in the soil, and means slidably connecting said runners so that one may be adjusted generally vertically relative to the other.

14. A combination seed and fertilizer furrow opener for planters and the like, comprising a pair of runners having substantially planar forward portions adapted to lie one against the other and laterally outwardly offset rear portions adapted to form laterally spaced furrows with a ridge of soil therebetween, and means for shifting one of said runners generally vertically relative to the other.

15. A furrow opener comprising a runner having its rear end laterally offset to form a furrow, the rear edge of said runner being inclined upwardly and rearwardly so that soil above the bottom of the furrow but below the upper surface will first fall back into the furrow after the passage of said runner.

16. In a planter, a combination seed and fertilizer furrow opener, comprising a pair of plate members having laterally outwardly diverging sections at the rear of the furrow opener, the lower edge of at least one of said sections being higher at the front portion than at the rear, whereby said members form laterally spaced furrows with a ridge of soil therebetween, means for delivering seed to one of said furrows, including a seed conduit member fixed to one of said members substantially directly rearwardly of the laterally outwardly extending section thereof, and means for delivering fertilizer to the other furrow, including a fertilizer conduit fixed to the other member substantially directly rearwardly of the laterally outwardly extending section of said other member.

17. In a planter, a combination seed and fertilizer furrow opener, comprising a pair of runner plates, each adapted to form a furrow and having a forward portion adapted to be disposed in a generally vertical plane and a rear section displaced laterally outwardly and disposed in a plane that extends generally upwardly and laterally inwardly, whereby to form two furrows with a ridge of soil therebetween and with the outer walls of the furrows tending to overhang the bottoms, respectively, of the furrows, and a pair of conduits, one for seed and the other for fertilizer, disposed substantially one behind the other, said conduits extending downwardly and laterally outwardly adjacent, respectively, the laterally outwardly displaced sections of said plates, so as to deposit seed and fertilizer in said furrows.

18. A combination seed and fertilizer furrow opener for planters and the like, comprising a pair of runners having substantially planar forward portions adapted to lie one against the other and laterally outwardly offset rear portions adapted to form laterally spaced furrows with a ridge of soil therebetween, and a pair of guide members secured, respectively, to each runner adjacent the offset portion thereof and having cooperating means serving to define the movement of one runner relative to the other.

19. In a planter, a frame, a combination seed and fertilizer furrow opener comprising a pair of runners having substantially planar forward portions adapted to lie one against the other and laterally outwardly offset rear portions adapted to form laterally spaced furrows with a ridge of soil therebetween, a pair of guide members secured, respectively, to each runner adjacent the offset portion thereof and having cooperating means serving to define the movement of one runner relative to the other, means for clamping said guide members to each other and to said frame, and seed and fertilizer feeding means on the frame for delivering seed and fertilizer to said furrows with the seed on one side of said ridge and the fertilizer on the other.

20. In a planter, a furrow opener comprising a pair of plates secured together at their forward ends with their rear ends diverging rearwardly and their lower edges angled so as to form a pair of laterally spaced furrows with a ridge of soil therebetween, and means for shifting one plate relative to the other so as to vary the relation between said furrows.

21. A combination seed and fertilizer opener comprising a pair of runners, each having a laterally outwardly disposed rear portion arranged to form a furrow in the soil, the rear edge of one of said runners being inclined upwardly and rearwardly so that soil above the bottom of the furrow but below the upper surface will first fall back into the furrow after the passage of said runner.

22. In a planter, a combination seed and furrow opener comprising a pair of runner plates, each adapted to form a furrow and having a forward portion adapted to be disposed in a generally vertical plane and a rear section displaced laterally outwardly, means for delivering fertilizer into one furrow, and means for delivering seed to the other furrow, the runner forming the seed furrow having a rear edge that extends further rearward at its upper portion than at its lower portion so that comparatively moist soil above the bottom of the furrow but below the upper surface will first fall back into the furrow to cover the seed after the passage of said runner to protect the seed from said fertilizer.

23. In a planter, a combination seed and fertilizer furrow opener comprising a pair of runner plates having forward portions adapted to be disposed in generally vertical planes and to be secured in juxtaposition and outwardly diverging rear portions adapted to form laterally spaced furrows, one of said plates having a recessed lower edge to leave a ridge of soil therebetween, means for depositing fertilizer in one of said furrows and means for delivering seed to the other furrow, the runner forming the seed furrow having a rear edge that extends further rearward at its upper portion than at its lower portion so that comparatively moist soil above the bottom of the furrow but below the upper surface will first fall back into the furrow to cover the seed after the passage of said runner to protect the seed from said fertilizer.

24. A combined seed and fertilizer furrow opener, comprising a pair of plate members connected along their upper edge portions and diverging downwardly and rearwardly so as to form two furrows when drawn through the soil, the forward portion of one member being rearward of the forward part of the other member and the lower edge of said one member being disposed above the lower edge of said other member, whereby the furrow opened by the latter member is deeper than the furrow opened by said one member, a seed spout fastened to the rear portion of said one member, and a fertilizer spout fastened to said other member and at a point where some soil may fall into the furrow opened by said other member before seed is deposited in the furrow opened by said one member.

25. The invention set forth in claim 24, further characterized by the rear end of said other member terminating, at least in the upper portion thereof, generally opposite said seed spout.

26. A combined seed and fertilizer furrow opener, comprising a pair of plate members connected together at their forward ends and diverging downwardly and rearwardly at their rear ends, the forward edges of said plate members being angled so that, when drawn through the soil, said plate members form two furrows, a seed conduit fastened to one of said members, and a fertilizer conduit fastened to one member, the rear edge of said latter member being disposed in an upwardly and forwardly extending line adjacent the point where the seed conduit is attached to its plate member so that some soil may fall into the furrow opened by said latter member before seed is deposited in the furrow opened by said first member.

ORVILLE F. DRENNAN.